(12) United States Patent
Kunze et al.

(10) Patent No.: US 9,733,016 B2
(45) Date of Patent: Aug. 15, 2017

(54) PROCESS AND ARRANGEMENT FOR EXTRACTING A METAL FROM SLAG A CONTAINING SAID METAL

(75) Inventors: Jürgen Kunze, Xanten (DE); Rolf Degel, Ratingen (DE); Dieter Borgwardt, Dorsten (DE); Andrzej Warczok, Etobikoke (CA); Gabriel Angel Riveros Urzua, Santiago (CL)

(73) Assignee: SMS GROUP GMBH, Duesseldorf (DE)

( * ) Notice: Subject to any disclaimer, the term of this patent is extended or adjusted under 35 U.S.C. 154(b) by 2089 days.

(21) Appl. No.: 11/921,885

(22) PCT Filed: Jun. 8, 2006

(86) PCT No.: PCT/EP2006/005497
§ 371 (c)(1),
(2), (4) Date: Feb. 23, 2009

(87) PCT Pub. No.: WO2006/131372
PCT Pub. Date: Dec. 14, 2006

(65) Prior Publication Data
US 2009/0211398 A1 Aug. 27, 2009

(30) Foreign Application Priority Data

Jun. 8, 2005 (DE) .................. 10 2005 026 589
May 16, 2006 (DE) .................. 10 2006 022 779

(51) Int. Cl.
*F27B 3/04* (2006.01)
*C22B 7/04* (2006.01)
(Continued)

(52) U.S. Cl.
CPC .................. *F27B 3/04* (2013.01); *C22B 7/04* (2013.01); *C22B 15/0054* (2013.01);
(Continued)

(58) Field of Classification Search
CPC ..... B22D 11/115; C22B 15/0054; C22B 7/04; C21D 5/04; F27B 3/04
(Continued)

(56) References Cited

U.S. PATENT DOCUMENTS 4,036,636 A 7/1977 Ammann
4,060,409 A 11/1977 Ammann
(Continued)

FOREIGN PATENT DOCUMENTS

DE 2707578 8/1977
DE 27 07 578 8/1997
(Continued)

*Primary Examiner* — Weiping Zhu
(74) *Attorney, Agent, or Firm* — Abelman, Frayne & Schwab

(57) ABSTRACT

The invention is directed to a process for extracting a metal from a slag containing said metal, wherein the liquefied metal-containing slag is heated in at least one electric arc furnace (1, 2). In order provide an improved method for recovering especially copper from slags, the invention provides that the metal-containing slag is heated in a first furnace (1) constructed as an AC electric furnace or a DC electric furnace, and the melt is introduced from the first furnace (1) into a second furnace (2) which is constructed as a DC electric furnace. Further, the invention is directed to an arrangement for extracting a metal from a slag containing said metal.

10 Claims, 2 Drawing Sheets

Figure 1:
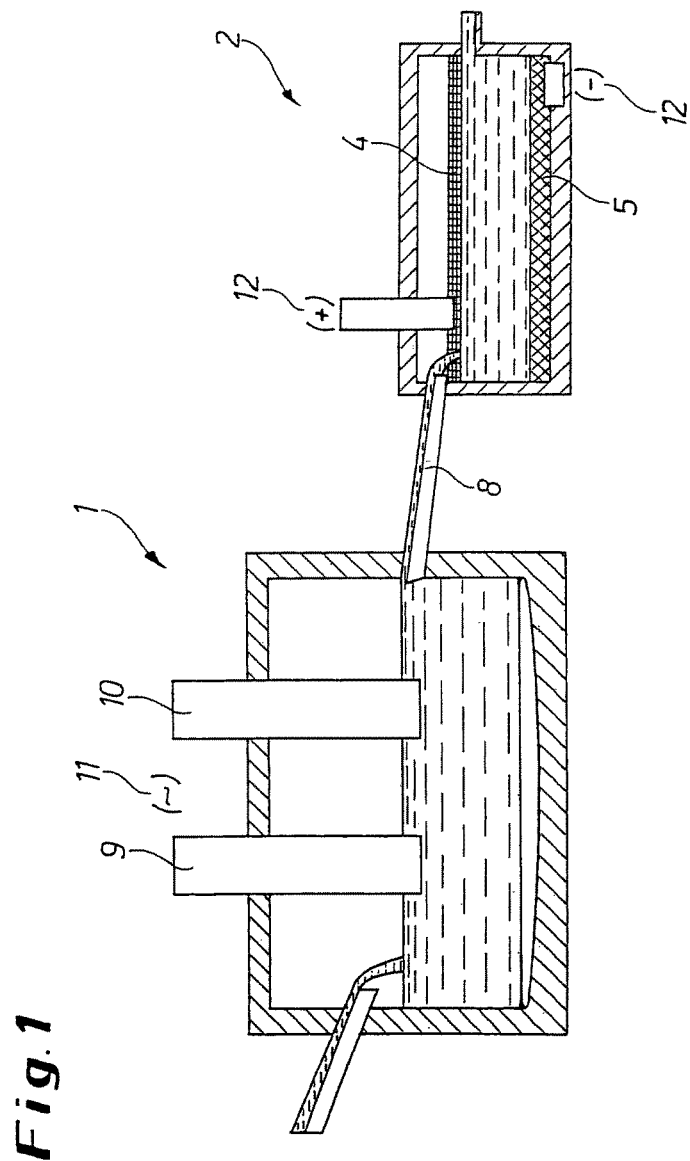

(51) Int. Cl.
*C22B 15/00* (2006.01)
*F27B 3/08* (2006.01)
*F27D 99/00* (2010.01)

(52) U.S. Cl.
CPC ...... *F27B 3/085* (2013.01); *F27D 2099/0023* (2013.01); *Y02P 10/212* (2015.11)

(58) Field of Classification Search
USPC .......................... 75/10.32; 148/108; 266/234
See application file for complete search history.

(56) References Cited

U.S. PATENT DOCUMENTS

| | | |
|---|---|---|
| 4,110,107 A | 8/1978 | Paulson |
| 5,205,859 A | 4/1993 | Goto |
| 5,217,527 A | 6/1993 | Goto |
| 5,320,662 A | 6/1994 | Goto |
| 5,479,433 A | 12/1995 | Maki et al. |
| 5,765,489 A | 6/1998 | Hugentobler et al. |
| 6,436,169 B2 | 8/2002 | Hirai |
| 6,699,302 B1* | 3/2004 | Jones et al. ................... 75/10.32 |
| 6,761,749 B1 | 7/2004 | Poijarvi |
| 2004/0187964 A1* | 9/2004 | Dardik et al. ................ 148/108 |

FOREIGN PATENT DOCUMENTS

| | | |
|---|---|---|
| JP | 60-208489 | 10/1985 |
| JP | 2000-337776 | 8/2000 |
| RU | 2121518 | 10/1998 |
| SU | 574478 | 9/1977 |
| WO | WO 97/00333 | 1/1997 |
| WO | WO 97/18415 | 5/1997 |

\* cited by examiner

PROCESS AND ARRANGEMENT FOR EXTRACTING A METAL FROM SLAG A CONTAINING SAID METAL

The invention is directed to a process for extracting a metal from a slag containing said metal, wherein the liquefied metal-containing slag is heated in at least one electric arc furnace. Further, the invention is directed to an arrangement for extracting a metal from a slag containing said metal.

Smelting of copper concentrates generates copper matte and slag. The slag contains copper in dissolved form and in the form of mechanically introduced matte inclusions. There are two basic methods for cleaning the slag: slag flotation after quenching, comminuting and grinding, and pyrometallurgical reduction of the liquid slag.

Pyrometallurgical slag cleaning is usually carried out in three variants, namely:
1) in an AC electric arc furnace by reduction with coke and electrodes, slag preheating and sedimentation,
2) in horizontal cylindrical rotary furnaces by injecting a reducing agent, e.g., in a Teniente slag cleaning furnace,
3) in vertical converters with injection of a reducing agent, e.g., TBRC or Isasmelt.

Slag cleaning requires the reduction of magnetite in order to free suspended inclusions, allow them to precipitate, and permit the coreduction of cupreous oxide.

Copper slag cleaning in AC electric arc furnaces, which is the most common, requires a relatively large furnace because of the time required for reduction and sedimentation which amounts to 3 to 8 hours. It involves a relatively high specific energy consumption due to the extensive specific influence of heat loss. Slag cleaning in an electric arc furnace is carried out as a batchwise or semi-continuous process. The flexibility of the electric arc furnace with respect to temperature regulation allows a correct preheating of the slag. However, the formation of dispersed metallic copper inclusions as a product of the reduction of cupreous oxide together with a portion of small copper matte inclusions restricts phase separation and sufficient copper recovery.

A process for recovering metals from metal-containing slags, particularly iron-copper slags, in a smelting furnace is known from U.S. Pat. No. 4,110,107. The molten slag is introduced into an electric arc furnace in which melting is carried out. A carbon injection unit is used to introduce carbon into the bottom area of the molten bath. A fluxing agent such as, e.g., CaO is likewise injected into the bath. After reduction, the metal is removed from the furnace.

A similar process for recovering particularly nickel and a nickel-copper mixture from a molten slag is known from U.S. Pat. No. 4,036,636. In this case, magnetite in the slag is reduced with carbon-containing materials. The slag is mixed by a mechanical stirrer while the reduction of the slag takes place.

WO 01/49890 A1 discloses a process for producing blister copper directly from copper sulfate concentrate, wherein the copper is won from finely ground, cooled copper matte in a reaction vessel by oxygen enrichment. The oxygenation is carried out by supplying oxygen-enriched air with an oxygen content of at least 50%. Blister copper is unrefined, blistered-appearing copper. In the molten-liquid state, copper has a higher solvency for gases than the solid metal. During hardening, the gases separate as small blisters in the copper.

U.S. Pat. No. 4,060,409 shows a pyrometallurgical system by which material can be kept in the molten state. The system has a vessel for receiving the material, and a quantity of cells of identical size are formed in the interior of the vessel. Further, a plurality of mechanical stirrers are provided for stirring the molten material.

U.S. Pat. No. 6,436,169 discloses a method for operating a copper smelting furnace. An iron-containing substance with more than 80 percent by weight iron and with a density between 3.0 and 8.0 is added. The diameter of the particles is between 0.3 mm and 15 mm. The iron-containing substance is added to iron-containing copper slag. Reduction of $Fe_3O_4$ to FeO is then carried out.

A device for continuous copper smelting is known from EP 0 487 032 B1. It has a smelting furnace for smelting and oxidizing copper concentrate in order to generate a mixture of matte and slag. Further, a separating furnace is provided for separating the matte from the slag. The matte separated from the slag is oxidized in a converter furnace to generate crude copper. The smelting furnace, separating furnace and converter furnace are connected by melt tapping runners. Anode furnaces are provided for refining the copper generated in the converter furnace. A connection between the converter furnace and the anode furnaces is formed by crude-copper runners.

EP 0 487 031 B1 discloses a process for the continuous smelting of copper. In this case also a smelting furnace, a separating furnace and a converter furnace are provided and are interconnected by flow connecting means. Further, anode furnaces are provided which have a flow connection to the converter furnace. The copper concentrate is fed into the smelting furnace, where the concentrate is melted and oxidized to produce a mixture of low-grade matte and slag. Next, the mixture of matte and slag is fed to the separating furnace in which the matte is separated from the slag. The matte which is separated from the slag is then introduced into the converter furnace, where it is oxidized to produce crude copper. The crude copper then flows into one of the anode furnaces where the copper is produced.

The known methods for extracting a metal from a slag containing said metal are still in need of improvement as regards efficiency. Therefore, it is the object of the invention to provide an improved method for recovering particularly copper from slags.

This object is met by the invention in that the metal-containing slag is heated in a first furnace constructed as an AC electric furnace or a DC electric furnace, and the melt is introduced from the first furnace into a second furnace which is constructed as a DC electric furnace.

The first furnace is preferably constructed as an AC electric furnace. In an advantageous manner, the metal to be extracted is copper that is found in a copper-containing slag.

Accordingly, the invention is directed to a recovery of copper from the smelting and conversion of copper slags by means of a two-step slag reduction and sedimentation in the AC electric arc furnace and DC reduction channel furnace, preferably—as will be seen in the following—by electromagnetic stirring.

The proposed method can also be used to reclaim metals such as lead, zinc, platinum or nickel from their respective slags.

A pre-reduction of the slag and a precipitation of metal matte, particularly copper matte, are preferably carried out in the first furnace constructed as an AC electric furnace. A thorough slag reduction and removal of inclusions then takes place in the second furnace which is constructed as a DC electric furnace.

An electrolytic precipitation of the metal to be extracted advantageously takes place in the second furnace which is constructed as a DC electric furnace.

The extraction process can be substantially improved when it is further provided that an electromagnetic stirring of the melt is carried out during the extraction of the metal in the second furnace which is constructed as a DC electric furnace. At least one electromagnet can act on the melt in the second furnace in order to generate the electromagnetic stirring. Alternatively, at least one permanent magnet can also be provided for this purpose. In a particularly preferable manner, the at least one magnet should generate a magnetic field between 50 and 1000 Gauss, wherein the magnetic field covers at least a portion of the cross section of the melt and of the area of the electrodes in the second furnace.

A reducing agent, particularly coke, is preferably introduced into the first furnace during heating.

Carbon-containing material, particularly coke, can be added to the surface of the melt in the second furnace in such a way that a layer of the carbon-containing material is formed with a substantially constant thickness, wherein the layer, acting as an anode, makes contact with an electric connection.

In the bottom area below the melt, a layer of metal matte, particularly copper matte, can be maintained with a substantially constant thickness in the second furnace, wherein the layer, acting as a cathode, can make contact with an electric connection.

The arrangement which is constructed in particular for implementing the process according to the invention is characterized by a first furnace which is constructed as an AC electric furnace or DC electric furnace and a second furnace which is constructed as a DC electric furnace, wherein connecting means for the melt, particularly a flow channel, are provided between the first furnace and the second furnace.

The first furnace is preferably an AC electric furnace. It can have two electrodes which penetrate into the melt in the first furnace and are connected to an AC source. The second furnace can have two plate-shaped electrodes which are arranged so as to extend horizontally in the top area and in the bottom area of the melt located in the second furnace and are connected to a DC source. The electrode located in the top area can be formed as a coke bed which communicates with an electric contact, particularly a graphite electrode. The electrode in the bottom area can be formed as a layer of metal matte, particularly copper matte, which communicates with an electric contact, particularly a graphite electrode. The second furnace is preferably constructed as a channel furnace. Finally, the arrangement preferably has, in the side areas of the second furnace, magnets, particularly electromagnets whose magnetic field lines are at least partially at right angles to the current conducting direction in at least some of the current-carrying elements. A Lorentz force generating the electromagnetic stirring effect can be generated in this way.

Accordingly, the invention proposes a two-step slag reduction and the removal of the copper in two electric arc furnaces. The first furnace, the three-phase electric arc furnace, is used for the pre-reduction of the slag and the precipitation of copper matte, followed by a thorough slag reduction and removal of inclusions in a DC reduction channel furnace with electromagnetic stirring. The use of electromagnetic stirring which improves the mass transfer on the reduction surface and the coalescence of the inclusions, together with slag electrolysis and electrokinetic phenomena, enable an efficient slag cleaning and high recovery of copper.

An embodiment example of the invention is shown in the drawings.

Figure 2A:
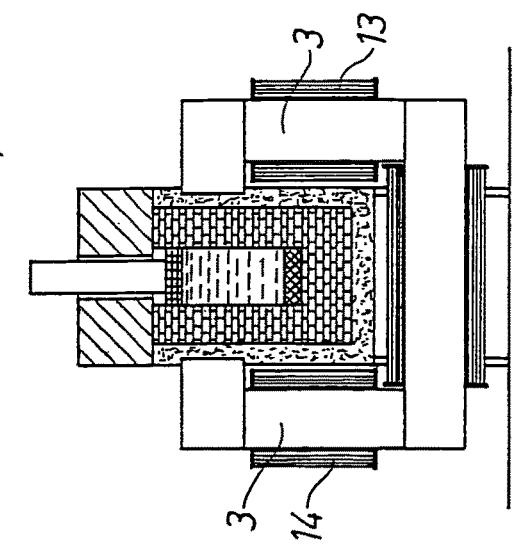
Figure 2B:
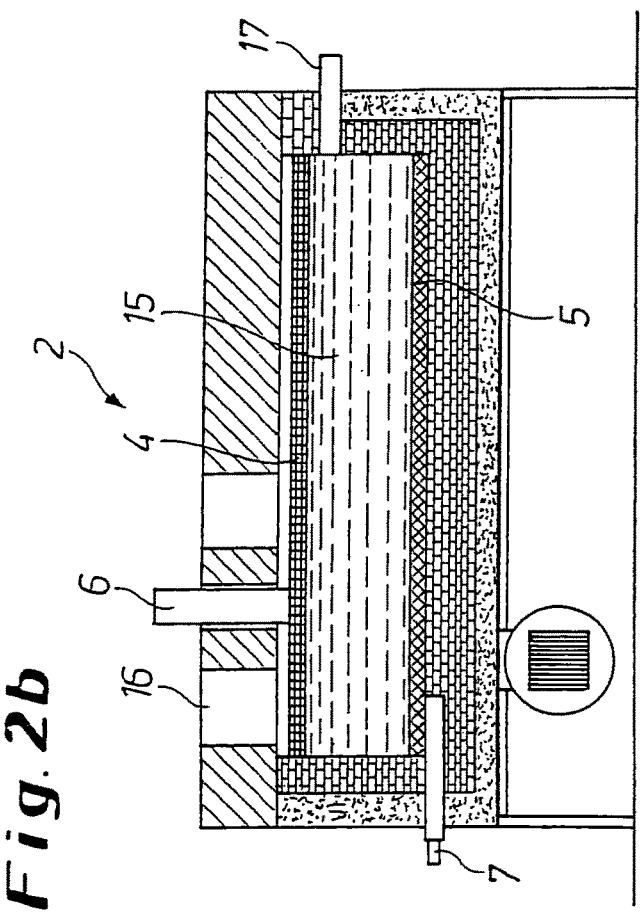

The drawings show:

FIG. 1 a schematic view of a three-phase electric arc furnace and a DC reduction channel furnace arranged downstream of the latter; and FIGS. 2a and 2b the sectional front view and sectional side view of the DC reduction channel furnace for thorough slag reduction and removal of inclusions using a coke bed and liquid copper matte as electrodes.

FIG. 1 shows a first furnace 1 in the form of an AC furnace to which a second furnace 2 in the form of a DC furnace is connected. The melt of copper slag prepared in the furnace 1 is guided into the second furnace 2 via connection means 8 in the form of a melt channel.

Two electrodes 9 and 10 in the form of graphite electrodes connected to an AC source 11 penetrate into the first furnace 1, namely, into the molten slag located in this furnace.

The second furnace 2 has a slag inlet 16 for the slag 15 and a slag outlet 17. Two plate-shaped electrodes 4, 5 are located in the second furnace 2. Both electrodes 4, 5 are coupled to a DC source 12 via electric connections in the form of a graphite contact electrode 6 and 7, respectively. The top, horizontally extending electrode 6 is connected to the positive pole of the DC source 12 and serves as an anode. The bottom electrode 5 which is also arranged horizontally is connected to the negative pole of the DC source 12 in a corresponding manner and accordingly serves as a cathode. The copper is extracted by means of an electrolytic process.

As can be seen from FIG. 2, the second furnace 2 is constructed as a channel furnace. At the sides, electric coils 13 and 14 are arranged around metal cores which accordingly form electromagnets 3. An electromagnetic stirring effect which stirs the melt in the second furnace 2 (see below) is generated by these magnets.

In the process according to the invention, liquid slag is processed substantially in the AC electric arc furnace 1 (AC furnace). Magnetite and cupreous oxide in the slag react with the carbon of the graphite electrodes 9, 10 and the added coke according to the following equations:

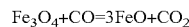
$$Fe_3O_4+CO=3FeO+CO_2$$

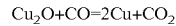
$$Cu_2O+CO=2Cu+CO_2$$

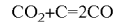
$$CO_2+C=2CO$$

The reduction of cupreous oxide is limited by the magnetite coreduction. The conditions for the coreduction are determined by the equilibrium of this reaction:

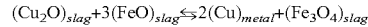
$$(Cu_2O)_{slag}+3(FeO)_{slag} \leftrightarrows 2(Cu)_{metal}+(Fe_3O_4)_{slag}$$

The copper content in the molten slag is between 2% and 10% and the magnetite content is between 10% and 20% depending on the smelting method and the grade of matte that is generated.

The first step in the slag treatment in the AC electric arc furnace 1 concentrates on the magnetite reduction to a value of 7% to 8% and a copper content of 0.8% to 1.2%, which requires a unit energy consumption of 50 to 70 kWh/t depending on the original slag composition. The degree of slag reduction indicated above allows the reduction time to be decreased by about 50%, which corresponds to a twofold increase of the furnace handling capacities. The slag is tapped off to the second DC reduction channel furnace 2 (DC furnace) continuously or at regular intervals.

The coke bed 4 on the slag surface by which the graphite electrode 6 makes contact with the DC source 12 functions as the anode, and the liquid matte 5 contacting the graphite block 7 is a cathode in the DC reduction channel furnace 2.

On the inlet side of the furnace, two permanent magnet blocks are arranged in the window of the furnace vessel, namely, at half of the height of the slag layer. The cooperation of a nonuniform, horizontal magnetic field with a nonuniform, vertical, constant electric field induces the gradient of the Lorentz force acting on the slag.

The Lorentz force which acts in the crossed constant electric and permanent magnetic fields in every elementary volume of conductive liquid such as, e.g., liquid slag, obviously changes the relative density of the liquid:

$$\gamma_A = \gamma \pm j \times B,$$

where $\gamma_A$—apparent relative density in N m$^{-3}$,
$\gamma$—relative density in N m$^{-3}$,
j—current density in a liquid in A m$^{-2}$,
B—magnetic induction in T.

With the above-mentioned force at a current density of 200 to 2000 A/m$^2$ and a magnetic field strength of 0.005 to 0.1 Tesla, the slag velocity is 1 to 2 orders of magnitude greater than the natural convection velocities. It sets the slag in intensive rotation in the area of the magnet so that the magnetite transfer to the coke surface is improved and the reduction is accelerated. At the high temperature of the slag reduction (1200° C. to 1300° C.), the reactions during the reduction of the magnetite and the coreduction of the cupreous oxide are controlled by mass transfer, the stirring of the slag substantially increases the reduction speed.

Further, the stirring of the slag prevents the formation of stagnant liquid and homogenizes the slag. The stirring of the slag in the first step of the process for removal of inclusions is advantageous for increasing the probability of their collision and coalescence.

The slag movement increases the probability of the collision of matte inclusions and metallic copper so that their coalescence and precipitation are improved. The second part of the channel furnace 2 does not experience any intensive slag movement and allows a steady sedimentation of the inclusions.

Due to the ion structure of the liquid slag, the DC current excites the slag electrolysis. Cathodic reduction and anodic oxidation result in the magnetite reduction, copper precipitation and formation of carbon monoxide on the electrodes corresponding to the following reactions:

Cathode: $Fe^{3+} + e = Fe^{2+}$ $Cu^+ + e = Cu^0$

Anode: $SiO_4^{4-} + 2C = SiO_2 + 2[CO] + 4e$ $O^{2-} + C = [CO] + 2e$

The cathodic decomposition of magnetite and the precipitation of copper increase the overall rate of the magnetite reduction and the removal of copper. The precipitation of CO as anodic product forms additional centers of the magnetite reduction.

The additional force acting on metallic inclusions as a result of the apparent change in the relative density of the slag and the interaction of the current in the metal and of the magnetic field are equal:

$$F_{EMB} = 2\pi j B r^3,$$

where $F_{EBF}$—buoyancy in N,
j—current density in A/m$^2$,
B—inductance of the magnetic field in T,
r—radius of the inclusion in m.

The interaction of the electric field with the electric surface charge on the surface of the inclusion allows the metal drops to migrate along the electric field lines; the migration velocity, known as a phenomenon of electrocapillary motion, is described by Levich's formula:

$$V_{EM} = \frac{\varepsilon E r}{2\eta_s \left(1 + \frac{r}{2Kw}\right)},$$

where $V_{EM}$—migration velocity in m s$^{-1}$,
$\varepsilon$—surface charge in coul m$^{-2}$,
E—strength of the electric field in V m$^{-1}$,
$\eta_S$—slag viscosity in Pa s,
$\kappa$—specific conductance of the slag in $\Omega^{-1}$ m$^{-1}$,
W—resistance of the metal/slag interface in $\Omega$ m$^2$.

Based on the electric charge density, the migration velocity of the metal or of the matte inclusions decreases with the drop radius based on the preceding formula. With smaller inclusions, the migration velocity is considerably higher than the precipitation resulting from the force of gravity.

The slag processing in the crossed electric and magnetic fields makes use of a number of phenomena by which the slag cleaning process becomes very intensive and effective. Electromagnetic stirring of the slag increases the mass transfer so that the slag reduction is accelerated and the coalescence of the inclusions is fostered. Simultaneous slag electrolysis acts as an additional reductant during cathodic reduction of magnetite and copper oxide and anodic formation of carbon monoxide. Electrocapillary migration of the inclusions promotes their coalescence and leads to the removal of inclusions from the slag.

EXAMPLE

Slag from the smelting of concentrate in a flash melting unit contains 4% Cu and 15% $Fe_3O_4$. The slag is tapped off every 3 hours and is transferred by a channel to the 9.5 MVA three-phase electric arc furnace 1. The slag production quantity amounts to 30 t/h which corresponds to a processing of 90 t in each cycle. The coke consumption comes to about 8 kg/t and the energy consumption to approximately 70 kwh/t corresponding to an average power consumption of 6.3 MW. After one hour, the slag is tapped out to the electric arc furnace over a period of 2 hours. The slag with a Cu content of 1.1% and 7% $Fe_3O_4$ is transported through the channel 8 into the DC electric arc furnace 2 with a chamber of 4 m in length and 1 m in width. FIG. 2 shows the reduction channel furnace for semi-continuous slag cleaning. The slag flows continuously through the reduction channel furnace 2 for 2 hours. With a slag level, of 1 m, the average holding time is about 30 minutes. With furnace heat losses of 1 GJ/h, the unit current consumption is approximately 35 kWh/t and the required power consumption is 1 MW. At an estimated voltage of 100 V, the current strength is in the order of magnitude of 10 kA. The estimated coke consumption is about 2 kg/t. The final slag contains 0.5% Cu and 4% magnetite. The total energy consumption amounts to 105 kWh/t and the coke consumption to 10 kg/t.

The process according to the invention works according to the embodiment example, that is, as a two-step copper slag cleaning in electric arc furnaces.

The first electric arc furnace 1 can be charged with slag periodically or continuously. In this furnace 1, the graphite electrodes or carbon electrodes are introduced into the molten slag and current is supplied via these electrodes. Coke or another reducing agent is added to the slag surface. The regulation of the slag temperature in the slag cleaning furnace is carried out by regulating the power consumption. Finally, the extracted metals are tapped off in the form of copper matte and metallic copper.

A periodic or continuous tapping off of slag can also be carried out in the DC channel furnace 2. A DC current is applied between the coke layer functioning as anode at the slag surface and the liquid matte functioning as cathode. The superimposed, locally limited magnetic field which is generated by electromagnets or permanent magnets is used to set the slag in motion. Coke is added to the slag surface to keep the layer thickness of the coke layer constant and to maintain favorable conditions of electric contact with the graphite electrodes or carbon electrodes. Here, also, a continuous or periodic tapping off of the cleaned final slag can be carried out. Similarly, the tapping off of the copper matte or of the copper matte together with metallic copper can be carried out periodically. Further, a copper matte (copper) layer is maintained on the furnace bottom as a liquid cathode, wherein the cathode is in contact with a graphite block.

The copper slag can be the slag that is extracted by smelting copper concentrates to form copper matte or to form blister copper directly as well as the slag that is extracted by conversion of copper matte.

A conventional AC three-phase electric arc furnace or a DC electric arc furnace can be used as first electric arc furnace 1.

The induction of a magnetic field generated by permanent magnets or electromagnets is preferably in the range of 50 to 1000 Gauss, wherein the permanent magnetic field covers part of the cross section of the liquid slag in the area of the electrode or electrodes in contact with the coke bed.

Graphite electrodes or carbon electrodes are preferably used as electrodes. The placement of the electrodes allows the current lines to cross the magnetic field lines. As a result of the optimal positioning of the electrodes, the current lines extend perpendicular to the magnetic field lines.

As was mentioned, the layer of liquid metal or metal matte under the slag contacts a graphite electrode or other electrode functioning as the cathode, while the carbon or coke layer at the slag surface is in contact with a graphite electrode or other electrode having the function of anode.

The strength of the DC current is preferably in the range of 500 to 50,000 A depending on the size of the slag cleaning unit, the slag quantity, and the temperature.

Although the suggested method is preferably provided for the extraction of copper, it can also be applied for other metals such as lead (Pb), zinc (Zn), platinum (Pt) or Nickel (Ni).

By means of the two-step slag reduction and the removal of the copper in two electric arc furnaces, the first three-phase electric arc furnaces can be used for the pre-reduction of the slag and precipitation of copper matte, followed by a thorough slag reduction and removal of inclusions in a DC reduction channel furnace with electromagnetic stirring. The use of electromagnetic stirring which improves the mass transfer on the reduction surface and the coalescence of the inclusions, together with slag electrolysis and electrokinetic phenomena, enable an efficient slag cleaning and a high recovery of copper.

LIST OF REFERENCE NUMERALS

1 first furnace (AC furnace)
2 second furnace (DC furnace)
3 electromagnet
4 electrode (anode)
5 electrode (cathode)
6 electric connection (graphite electrode)
7 electric connection (graphite electrode)
8 connection means
9 electrode
10 electrode
11 AC source
12 DC source
13 electric coil
14 electric coil
15 slag
16 slag inlet
17 slag outlet

The invention claimed is:

1. A process of extracting a metal from a slag containing said metal, comprising the steps of:
   heating the metal-containing slag in a first furnace designed as an alternating current electrical furnace, and carrying out pre-reduction of slag and precipitation of metal matte in the first furnace;
   conveying the metal matte into the second furnace designed as a direct current electrical channel furnace, and carrying out a thorough slag reduction and removal of inclusion in the second furnace, with separating the to-be-extracted metal by electrolytic precipitation accompanied by an electromagnetic stirring of the melt.

2. A method according to claim 1, wherein the to-be-extracted metal is copper contained in the metal-containing slag.

3. A method according to claim 1, wherein the to-be-extracted metal is lead, zinc, platinum, or nickel contained in the slag.

4. A method according to claim 1, wherein at least one electromagnet acts on the melt in the second furnace in order to generate the electromagnetic stirring.

5. A method according to claim 4, wherein the at least one electromagnet generates a magnetic field between 50 and 1000 Gauss, and in that the magnetic field covers at least a portion of a cross section of the melt and of an area of electrodes in the second furnace.

6. A method according to claim 1, wherein at least one permanent magnet acts on the melt in the second furnace in order to generate the electromagnetic stirring.

7. A method according to claim 1, comprising the step of introducing a reducing agent into the first furnace during heating.

8. A method according to claim 7, wherein the reducing agent is coke.

9. A method according to claim 1, comprising the step of adding carbon-containing material to the surface of the melt in the second furnace in such a way that a horizontally extending layer of the carbon-containing material is formed with a substantially constant thickness and forms a horizontally extending anode layer in contact with an electric connection.

10. A method according to claim 9, comprising the step of maintaining a horizontally extending layer of the metal matte with a substantially constant thickness in the second furnace in the bottom area below the melt, and the layer, acting as a cathode, makes contact with an electric connection.

\* \* \* \* \*